United States Patent [19]

Roller

[11] 4,330,520

[45] May 18, 1982

[54] PROCESS AND APPARATUS FOR PREVENTING $NO_x$ EMISSIONS AFTER EMERGENCY SHUTDOWNS OF PLANTS FOR THE MANUFACTURE OF NITRIC ACID

[75] Inventor: Günter Roller, Cologne, Fed. Rep. of Germany

[73] Assignee: Davy McKee Aktiengesellschaft, Frankfurt, Fed. Rep. of Germany

[21] Appl. No.: 217,541

[22] Filed: Dec. 17, 1980

[30] Foreign Application Priority Data

Dec. 18, 1979 [DE] Fed. Rep. of Germany ....... 2950872

[51] Int. Cl.$^3$ ...................... C01B 21/40; F01L 25/00
[52] U.S. Cl. .................................................. 423/392
[58] Field of Search .................. 423/392, 404; 41/1.7; 60/404; 417/323, 374, 375

[56] References Cited

U.S. PATENT DOCUMENTS

| | | | |
|---|---|---|---|
| 2,942,953 | 6/1960 | Shields | 423/392 X |
| 2,955,917 | 10/1960 | Roberts et al. | 423/392 |
| 3,450,498 | 6/1969 | Sales | 423/392 |
| 3,977,815 | 8/1976 | Stull | 60/404 X |

FOREIGN PATENT DOCUMENTS 46-14811  4/1971  Japan .................................. 423/392

1068568  5/1967  United Kingdom ................ 423/392

OTHER PUBLICATIONS

Niezgoda, R. B. et al., "Nitrogen," vol. 112, 1978.
Olsen, John C., *Unit Processes and Principles of Chemical Engineering*, Van Nostrand Co., N.Y., 1932, pp. 1–3.

*Primary Examiner*—G. O. Peters
*Attorney, Agent, or Firm*—Bernard, Rothwell & Brown

[57] ABSTRACT

The process and apparatus described seeks to prevent $NO_x$ emissions after an emergency shutdown in a process for manufacturing nitric acid by catalytic combustion of ammonia, compression of the nitrous combustion gases and subsequent absorption. Immediately on shutdown the intake nitrous gas supply to the compressor is interrupted, the residual intake side nitrous gases are conveyed to the delivery side, the delivery side gas volume is shut off, the gas on the delivery side is expanded to the intake side and then exhausted into a vacuum system. Subsequently the acid charged with $NO_x$ in the absorption stages is drawn off, degassed acid is circulated through the absorption stages until equilibrium is established, the pressure of the shutoff section is released and cooled acid is admitted to the absorption stages.

29 Claims, 1 Drawing Figure

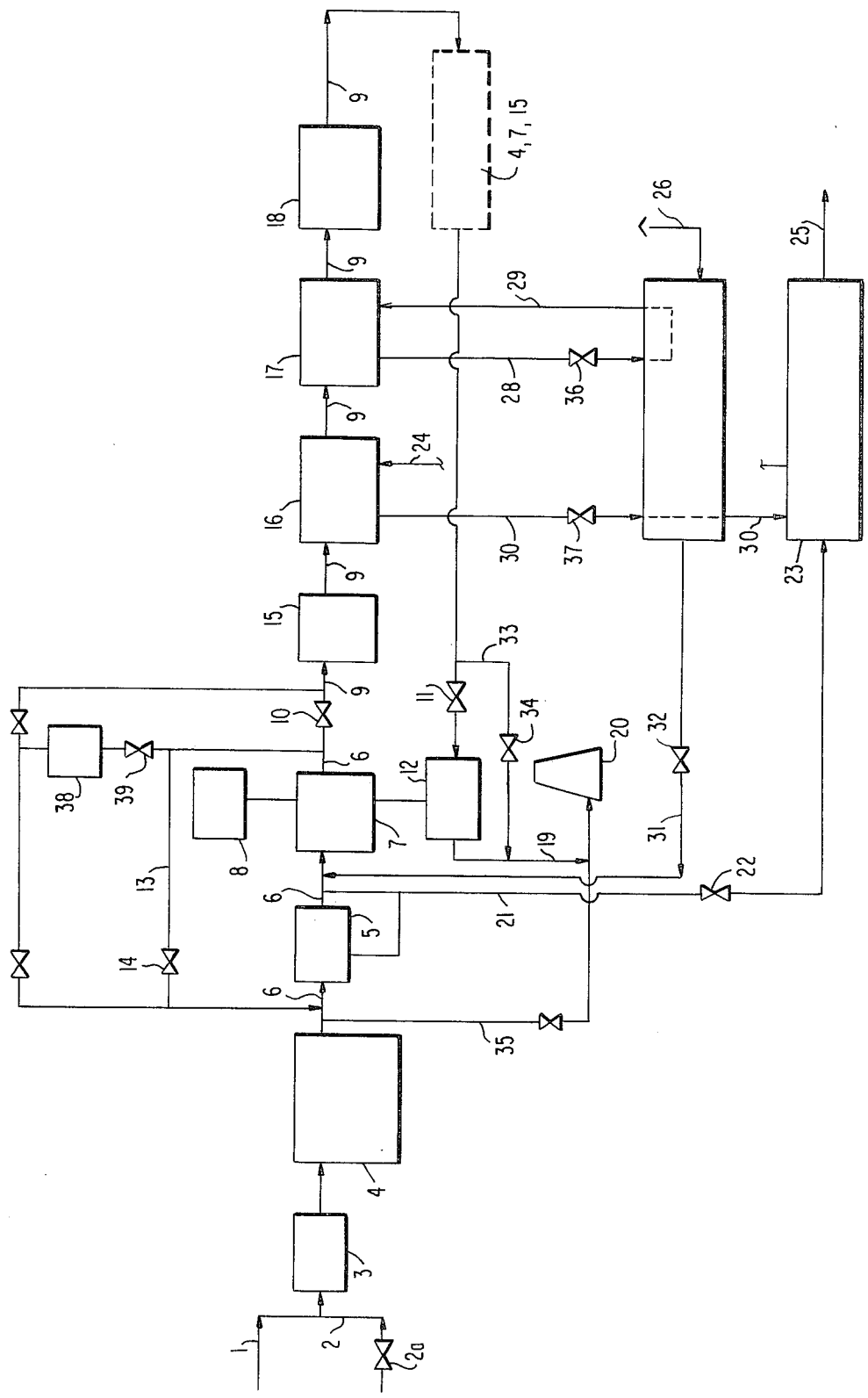

PROCESS AND APPARATUS FOR PREVENTING NO$_x$ EMISSIONS AFTER EMERGENCY SHUTDOWNS OF PLANTS FOR THE MANUFACTURE OF NITRIC ACID

The invention relates to a process for preventing NO$_x$ emissions after emergency shutdowns of plants for the manufacture of nitric acid by catalytic ammonia combustion with air, compression of the nitrous combustion gases and chemical and/or physical absorption of the nitrous gases from the gas stream.

The invention is also concerned with an apparatus by which this process is carried into effect.

By way of example, with the process disclosed in U.S. Pat. No. 3,676,065, the compressed nitrous gases are cooled and are conducted through a chemical absorption stage, a physical absorption stage and also a post-absorption stage for holding back acid vapors.

In the chemical absorption stage, a part of the nitrous gases is converted into over-azeotropic acid, e.g., 70 to 80% HNO$_3$. In the physical absorption, the nitrous gas, which is still in the gas stream, is washed out under pressure down to acceptable traces, e.g., 220 ppm (V). The charged washing or scrubbing acid is freed from the physically dissolved NO$_x$ in a desorption stage by means of air being blown therethrough; the air with a high NO$_x$ content is sucked in by the nitrous gas compressor. The over-azeotropic nitric acid formed in the chemical absorption, after desorption of the physically dissolved NO$_x$, is separated by rectification into a highly concentrated, e.g. 99% nitric acid, forming the final product, and an azeotropic nitric acid (68 to 69% HNO$_3$) returning into the process. The rectification stage is operated, depending on the choice of material, under vacuum or at atmospheric pressure.

In the continuous operation of nitric acid plants, the emission of NO$_x$ may be further controlled by other suitable absorption stages and/or catalytic tail gas purification stages. In the event of sudden emergency shutdowns of the plant, which may, for example, be caused by failure of the electric current and thus of the electric driving motor of the nitrous gas compressor, nitrous gases frequently do escape into the atmosphere. Such escape is generally caused by (a) opening of the blowoff valve on the pressure or delivery side of the nitrous gas compressor, resulting in release of compressor gases to prevent the "pumping" of the compressor, and (b) subsequent or simultaneous expansion of gases in the pressurized system via the chimney into the atmosphere. Attempts have been made to avoid the emission caused by step (a) by venting gas which is to be blown off through scrubbing towers at approximately atmospheric pressure. However, the washing or scrubbing out of the NO$_x$ at atmospheric pressure is not satisfactory. In connection with the release of gases resulting from step (b), it has not been possible to achieve a sufficient scrubbing of the nitrous gases trapped in the plant without the assistance of an emergency power unit.

On the other hand, it is highly undesirable that the nitrous gases should remain in the plant, since they are capable of causing considerable corrosion and make difficult the normal re-starting of the plant. As a consequence, emergency shutdowns have heretofore always resulted in environmental pollution effects caused by escaping nitrous gases.

An object of the present invention is to avoid environmental pollution caused by emissions of NO$_x$, which occur after emergency shutdowns of plants for the manufacture of nitric acid as a consequence of the then necessary removal of the nitrous gas which is present in the plant. With this removal the nitrous gases which are trapped in the plant should not be lost. Furthermore, it is desirable that no additional utilities, more especially no fuel, and only limited additional equipment, and more especially no emergency power unit and no large gas vessels, should be needed for eliminating the nitrous gases from the plant.

The present invention is accordingly concerned with a process for preventing emissions of NO$_x$ after emergency shutdowns in plants for the manufacture of nitric acid by catalytic combustion of ammonia with air, compression of the nitrous combustion gases in a nitrous gas compressor having an intake side and a delivery side, and chemical and/or physical absorption of the nitrous gases from the gas stream in one or more chemical or physical absorption stages, which process comprises the steps of immediately upon such emergency shutdown—
 (a) interrupting the supply of nitrous gas to the intake side of the nitrous gas compressor;
 (b) conveying the nitrous gases which are on the intake side through the nitrous gas compressor to the delivery side;
 (c) shutting off the gas volume which is on the delivery side of the nitrous gas compressor thereby establishing shutoff pressure sections; expanding the gas volume which is in the nitrous gas compressor to the intake side of the compressor; and drawing off by suction the gas volume which is then on the intake side into a vacuum system;
and thereafter—
 (d) drawing off acid which is charged with NO$_x$ and which is in the chemical and/or physical absorption stages;
 (e) circulating degassed acid through the chemical and/or physical absorption stages, and
 (f) after establishing equilibrium in the chemical and/or physical absorption stages, expanding the gases in the shutoff pressure section downstream of the absorption stages while simultaneously charging said absorption stages with cooled acid.

The process according to the invention thus serves to reduce emissions of NO$_x$ from nitric acid plants, which consist of at least the following apparatus or plant components:
 nitrous gas compressor
 absorption system for nitrous gases (on the pressure or delivery side of the nitrous gas compressor).
The process and apparatus of this invention are not limited to specific absorption means. For example, the absorption system may consist of only a chemical absorption stage or only of a physical absorption stage or of a combination of both absorption stages. In addition to the absorption system, the following processing stages may also be employed for increasing the NO$_x$ content: physical absorption combined with a desorption or chemical absorption combined with a decomposition stage.

In the manufacture of highly concentrated nitric acid, plant components may be connected downstream of or in parallel with the absorption system, as, for example:
 unit for rectification of over-azeotropic nitric acid into highly concentrated acid and azeotropic acid,
 bleaching column with N$_2$O$_4$ liquefaction and HNO$_3$ formation with oxygen in autoclaves (e.g., the HOKO process, as described in *Hydrocarbon Processing*, 45, 183–188 (November 1966).

The presence or absence of the latter stages does not have any deleterious effect on the process according to the invention.

The process of the present invention accordingly covers the approximate time interval from the emergency shutdown due to power failure or compressor failure up to substantially complete depressurization of the gas in the plant.

After such process is carried out, the plant is in a state such that it can be re-started under conditions similar to those occurring after a normal shutdown. The process of the invention comprises two phases. The first phase, with the process steps (a) through (c), has to start in practice immediately upon emergency shutdown, for example, caused by power failure, because it is by these stages that the nitrous gas compressor is mainly protected against "pumping" and this must take place immediately. The second phase of the process (process steps (d) through (f)), can be carried out subsequently or later, when all conditions are favorable for the purpose, i.e. electrical energy and other auxiliary means are once again available. By the automatic shutting-off of the nitrous gas volume in the plant on the delivery side or downstream side of the nitrous gas compressor, any escape of such nitrous gas in the meantime is thereby avoided.

Step (a) of the process of this invention serves to substantially prevent formation of any new nitrous gas. Consequently, the volume of nitrous gas to be eliminated from the plant is that volume which is present in the plant after step (a) has taken place. During step (b) the nitrous gas compressor advantageously continues to run for a period of at least about 10 seconds, preferably from about 10 to about 30 seconds. During this period the gases are passed into a separate vessel kept under atmospheric or a lower pressure during normal operation. Depending on the characteristic of the compressor, the mean final pressure will be in the range of approx. 50% of the normal operating pressure. By continuing to run in this manner, the nitrous gas compressor draws off by suction the nitrous gases which are in the ammonia combustion section and in the desorption section, respectively, or which are in the decomposition stage of the plant, and conveys these gases into the pressure section of the plant. As a consequence, these nitrous gases are replaced by air drawn in from the atmosphere. This air which is drawn in is thereafter generally not completely free from nitric oxide but, as a consequence of after-desorption, it still contains relatively small quantities of nitric oxides. The energy for this time limited run-on of the nitrous gas compressor may be partly supplied by the expansion of tail gas in the tail gas expansion turbine, which supplies energy to the compressor. Such energy may also be supplied from the rotational or inertial energy of the compressor and/or of another part coupled to the compressor. The compressor thus has sufficient mass so that rotational energy stored therein, combined with any other means employed, provides the desired run on time. The further running time of the compressor is, in any case, such that at least substantially all the volume of nitrous gas which is on its suction or intake side of the compressor is conveyed into the described system on its pressure or delivery side. This time interval and the size of the vessel required can be easily determined from the gas volume to be delivered and the characteristics of the compressor. At the same time, in step (c), the gas volume which is on the pressure side of the nitrous gas compressor in the absorption section of the plant is shut off hermetically, so that it is unable to escape from this section of the plant during subsequent operational steps. After the time interval described above, the blowoff valve to the suction side is opened, so that the gas volume still present in the nitrous gas compressor and the adjoining pipe section is able to flow to the suction side of the compressor and the undesired "pumping" of the compressor is avoided. Finally, about simultaneously with the opening of the blowoff valve, or shortly thereafter, the volume of nitrous gas present in the plant on the intake side of the nitrous gas compressor, in the nitrous gas compressor and the connecting pipe section on the pressure or delivery side and, if present, in the desorption section or the decomposition stage is sucked out into a vacuum system which is ready for that purpose. Whereas substantially all of the nitrous gas on the suction side of the nitrous gas compressor and from the compressor itself is removed by step (b) and is replaced by air, an additional safeguard is provided by the suction of the indrawn air into the vacuum system, since this system is advantageously so designed that it is in turn able to take all the gas volume of those apparatuses connected on the suction side of the compressor. This suction step thus also removes from the intake section of the plant those small quantities of nitrous gases which pass by subsequent desorption into the gas phase. Removal of gas by suction into a vacuum system also prevents emissions of $NO_x$ in the more unusual event of an emergency shutdown of the compressor. Such a shutdown could be caused, for example, by interruption of the main drive, e.g. by electric motor, and the tail gas turbine.

The second phase of the process of this invention may start immediately following the first stage or may take place at a later time. The second phase serves to eliminate from the delivery or pressure side of the plant the trapped volume of nitrous gas which is under pressure, that is, the shutoff pressure section.

Initially, in step (d) acid which is charged with dissolved $NO_x$ which is obtained from the sumps of the chemical and/or physical absorption stages (coming from the plates and from the packing layers, respectively) is drawn off into a vessel provided for this purpose. Then in the following step (e) degassed, cold nitric acid is supplied from another vessel into the chemical and/or physical absorption stages and is circulated through said stages until a state of equilibrium has been established. The time necessary for this purpose may be from a few minutes to several hours, and is generally in the range of from about 0.5 to about 2 hours. With this circulation of acid and depending on the operating conditions, a part of the nitrous gas present in these stages can be chemically converted into nitric acid. Another part of such nitrous gas is physically dissolved in the nitric acid. As a result, a gaseous $NO_x$ in the absorption stages can be lowered substantially. For example, a diminution of the amount of such gaseous $NO_x$ by about 50% or more can be achieved. In a plant which produces 200 t/d of concentrated $HNO_3$, the volume of circulated acid can be as low as about 4 cubic meters, and preferably is at least from about 6 to 8 cubic meters. After the state of equilibrium has been established in step (e), the circulation of acid is stopped and the pressure of the gas in the plant is released. During the release cooled nitric acid is delivered to the absorption stage or stages, and the absorption is run with substantially the same operating conditions as with the normal production, i.e. with substantially the same acid concentration, substantially the same acid temperature and substantially the same specific flow rate of acid per cross sectional area. The after-absorption also remains in operation. The nitric oxide content is further lowered by the contact of the gas escaping into the atmosphere with the acid supplied to the absorption. The supply of acid is immediately stopped when atmospheric pressure is reached in the absorption system. During this release of pressure, with a plant producing 200 t/d of concentrated HNO₃, from about 10 to about 30, preferably abut 20 cubic meters of acid are supplied to the absorption stage. The time of pressure release in this case amounts to about 20 minutes. The quantity of acid delivered and the quantity of acid remaining from step (e) in the plant remain in the system for restart-up of the plant. During the period of pressure release, e.g. about 20 minutes, the average $NO_x$ content of the blow-off gas amounts to about 600 ppm (volume basis) with the mixed gas blower being in operation.

In accordance with a preferred embodiment of the process of this invention, the gas volume which is in the compressor is expanded in step (c) into the inlet of the gas-cooling means after the combustion of ammonia. Since the gas volume is sucked off from a point downstream of the outlet of the gas-cooling means into the vacuum system, the warm gas coming from the compressor flows through the gas cooler before it is sucked off, as a result of which, the effective gas volume is slightly reduced.

In accordance with a preferred embodiment for the manufacture of concentrated nitric acid, the gas volume existing on the suction or input side of the compressor is sucked off into a rectifying column operating under vacuum. It is unnecessary in this case to provide a separate vacuum vessel. If necessary, the rectifying section operating under vacuum can be designed to be of such a size that substantially all the gas volume existing on the suction or intake side of the compressor can flow off into the rectifying system.

In a particular embodiment of the process of the invention, the acid circulation through the absorption stages according to step (e) is carried out after adding oxygen or hydrogen peroxide. As a result of the circulation of acid in the presence of additional oxygen or hydrogen peroxide, the quantity of nitric oxide in the gas phase is further reduced by additional formation of nitric acid. In a plant, as mentioned above, with a capacity of 200 t/d of concentrated HNO₃, the acid circulation, in the presence of additionally about 50 cubic meters of $O_2$ causes a further reduction of the amounts of nitric oxide of the gas phase by about 25%, i.e. in step (e), altogether by about 75%. Since emergency shutdowns do not occur too frequently and oxygen is readily available in pressure vessels, e.g. for welding purposes, the additional use of oxygen can be economically justified if very strict regulations as regards the emission of $NO_x$ exist.

The supply of nitrous gas in step (a) may be interrupted by shutting off the supply of ammonia for the combustion and possibly interrupting the return of acid charged with $NO_x$ to the desorption or decomposition stage. Care is to be taken in every case that, from the instant of the emergency shutdown, no new nitrous gas is any longer formed and/or passes into the gas phase on the suction or intake side of the nitrous gas compressor.

The apparatus by which the process of this invention is carried into effect is characterized in that the running time of the nitrous gas compressor, in the event of emergency shutdown, is such that at least substantially all of the volume of nitrous gas which is on the suction or intake side of the compressor is conveyed into the delivery side system. Such running time is generally at least about 10 seconds, and is preferably in the range from about 10 to about 30 seconds. This running time can be accomplished by drive by the tail gas turbine or an increased mass of its rotating parts as compared with the normal construction or both. This is valid under the provision that the pressure on the delivery side of the compressor is reduced as compared to the normal operating pressure on that side.

In this respect, the increased mass which results in a higher angular momentum may be provided not only in the nitrous gas compressor, but also in other drive units coupled with such compressor, e.g. the tail gas turbine. As a result of the longer slowing time, it is ensured that the gas volume located on the suction or intake side of the nitrous gas compressor in the plant is conveyed at least once completely to the pressure or delivery side.

Furthermore, valved blowoff pipes advantageously connect the delivery side of the nitrous compressor with the intake side of the compressor, at a point between the ammonia combustion unit and the nitrous gas cooler. The point of connection of the blowoff pipe on the delivery side is upstream from the delivery side shutoff valve. By means of this blowoff pipe, process step (c) allows the gas in the nitrous gas compressor or on its delivery side before the shutoff valve to be expanded into the suction or intake side. Furthermore, provision may be made for a valved pipe connecting the delivery side of the compressor, upstream from the shutoff valve, with a vacuum system. By means of the said pipe, the gas volume located before the shutoff member can be sucked off into the vacuum system. The valves and shutoff members which are provided are for the major part operated automatically.

The invention is hereinafter more fully described, by way of example with reference to the drawing, in which is represented a diagrammatic flow diagram of a plant by which one embodiment of the process according to the invention is carried into effect.

Air and ammonia gas are respectively fed by way of the pipes 1 and 2 to a mixed gas blower 3. The gas mixture is burned to form nitrous gas in the ammonia-combustion unit 4 which is equipped with a waste-heat boiler. The nitrous gas flows at about atmospheric pressure, e.g. from about 0.8 to about 5 bar, preferably from about 1 to 2 bar, more preferably about 1 bar, through the pipe 6 and gas cooler 5 to the nitrous gas compressor 7, in which the stream of nitrous gas is compressed to a pressure of from about 5 to about 15 bar, preferably from about 8 to 12 bar, most preferably to about 9 bar. The compressor 7 is driven by an electric motor 8 and a tail gas turbine 12. The compressed nitrous gas flows from the compressor 7 via pipes 6 and 9 to a gas cooler 15, where it is cooled from its temperature of about 150° C. to a temperature from about 30° to about 100° C., preferably from about 50° C. to about 70° C., and most preferably about 60° C. The nitrous gas then flows into the chemical absorption column 16, in which it is brought into contact with azeotropic acid supplied through pipe 24.

Some of the nitric oxide is converted into nitric acid. The over-azeotropic acid leaves the chemical absorption stage 16 through pipe 30. The effluent gas of the chemical absorption state 16, which gas still contains $NO_x$, flows via pipe 9 to the physical absorption stage 17, in which the residual nitrogen oxide is physically scrubbed almost completely from the gas stream. The gas then flows through an after-absorption stage 18 for removing acid vapors and acid droplets from the gas stream. The effluent tail gas is heated by heat exchange in the stages 4 and/or 7 and/or 15 and, with the valve 34 being closed and the valve 11 being open, is then expanded in the tail gas turbine 12 and is conducted via pipe 19 to the stack 20. The acids discharging from the absorption stages 16 and 17 by way of pipes 30 and 28, respectively, are freed from gas in the desorption stage 27 by means of air supplied from the atmosphere via pipe 26. The degassed, over-azeotropic acid coming from the chemical absorption stage 16 passes by way of pipe 30 into the rectifying stage 23, in which it is split up into product acid, having a concentration of 99% which is discharged via pipe 25, and azeotropic acid, which is recycled via pipe 24 into the stage 16. The absorber acid from the absorption stage 17 which is degassed in the desorption stage 27 is recycled via pipe 29 into the said stage 17. The air charged with the desorbed nitric oxides and coming from stage 27 is once again drawn in by the nitrous gas compressor 7 via pipe 31 having the shutoff valve 32.

With the emergency shutdown, for example caused by failure of the power for the driving motor 8 of the nitrous gas compressor 7, the emission of $NO_x$ is almost completely prevented in the following manner, when using the process according to the invention: The supply of ammonia to the ammonia combustion unit 4 is interrupted by closing the valve 2a, and the supply of acid charged with nitric oxides to the desorption stage 27 is interrupted by closing the valves 36 and 37. As a consequence of the short-time run-on of the compressor set, the compressor continues to run until the gas volume which is on the suction or intake side of the compressor, i.e. the gas volume in the apparatus 4, 5, 27 and the intake side pipe sections 6 and 31 is conveyed to the pressure or delivery side of the compressor respectively into the vessel 38. The valve 39 is thereafter closed and valve 14 consequently opened, so that the gas volume which is present in the nitrous gas compressor 7 is able to flow by way of pipe 13 to the nitrous gas pipe 6 on the intake side of the gas cooler 5. After opening of valve 39 the volume of nitrous gas on the pressure side of the nitrous gas compressor is shut off by closing the valves 10 and 11 with the valve 34 being closed, so that such gas is confined to the plant. Finally, the valve 22 is opened, so that the gas volume which is present in the apparatus 4, 5, 7, 27 and the pipes 6, 13, 31 is able to flow via pipe 21 into the rectifying system 23 which was maintained under vacuum.

The gas volume which is trapped under pressure in the absorption section between the valves 10, 11 and 34 is removed from the plant in the following manner at a later time, when the driving energy for the circulation pumps of the absorption columns 16, 17 and for the mixed gas blower 3 is once again available. Initially, the acid which is charged with $NO_x$ and which is still present in the absorption stages 16 and 17 is drawn off into a separate vessel (not shown) and is replaced by degassed acid. This acid is circulated through the absorption stages 16 and 17, until the equilibrium has been substantially established, i.e. the nitric oxide contained in the columns has been partially converted chemically into nitric acid and has been partially dissolved physically in the circulated acid. After this equilibrium has been achieved, the circulation is stopped. The gas trapped in the absorption sections 9 and 15–18 is expanded by opening the valve 34, via the pipes 33 and 19 to the stack 20 with the absorption column 17 being simultaneously charged with cooled azeotropic acid. In this manner the major part of the $NO_x$ still contained in the gas passes from the gas into the acid. The tail gas flowing to the stack is further diluted by air conveyed by way of blower 3 into the pipe 35, if this is necessary.

EXAMPLE

In a plant, such as described by reference to the drawing, 200 t/d of concentrated $HNO_3$ are produced. By an appropriate design of the nitrous gas compressor, and the vessel, a guarantee is given that it continues to run for 15 seconds after emergency shutdown of the driving means. With the emergency shutdown, the supply of ammonia for combustion and the desorption are simultaneously interrupted. With the running down of the nitrous gas compressor, the absorption section is shut off, the pressure or delivery side of the compressor is released to the intake side and the intake side is connected to the rectifying system which is under vacuum, so that the gases which are on the suction or intake side are able to flow into the column. The acid in the absorption columns is then replaced by approximately 6 cubic meters of degasified azeotropic acid, and 50 cubic meters of oxygen are passed into this section of the plant. The acid is circulated for one hour through the columns. Thereafter, the pressure of the pressurized section is released during a period of 20 minutes, and 20 m³ of azeotropic acid is simultaneously admitted to the physical absorption column. During the 20-minute pressure release period, the mean $NO_x$ concentration of the exhaust gas amounts of about 600 ppm (V) and the total discharged quantity of $NO_x$, calculated as $NO_2$, amounts to about 20 kg.

By contrast, if the quantity of nitrous gas present at the time of an emergency shutdown in the same plant is blown out of the plant without using the process according to the invention, it has to be expected that there will be a discharge of $NO_x$ which is about 20 times greater.

I claim:
1. A process for reducing $NO_x$ emissions after emergency shutdowns of plants for the manufacture of nitric acid by catalytic combustion of ammonia with air, compression of the nitrous combustion gases in a nitrous gas compressor having an intake side and delivery side, and chemical and/or physical absorption of the nitrous gases from the gas stream, comprising the steps of:
   immediately upon such emergency shutdown—
   (a) interrupting the nitrous gas supply to the intake side of the nitrous gas compressor;
   (b) conveying the nitrous gases which are on the intake side through the nitrous gas compressor to the delivery side;
   (c) shutting off the gas volume is on the delivery side of the nitrous gas compressor thereby establishing shutoff pressure sections; expanding the volume of gas existing in the nitrous gas compressor to the intake side of the compressor; and drawing off by suction the gas volume which is then on the intake side into a vacuum system;
   and thereafter—

(d) drawing off acid which is charged with $NO_x$ and is in the chemical and/or physical absorption stages;

(e) circulating degassed acid through the chemical and/or physical absorption stages; and (f) after establishing equilibrium in the chemical and/or physical absorption stages, expanding the gases in the shutoff pressure section downstream of the absorption stages while simultaneously charging said absorption stages with cooled acid.

2. The process of claim 1, wherein in step (c), the gas volume which is in the compressor is expanded into a point downstream of the combustion of ammonia.

3. The process of claim 1 or 2, wherein the gas volume present on the intake side of the compressor is sucked off into a vessel which is under vacuum.

4. The process of claim 1 or 2, wherein the circulation of acid through the absorption stages in accordance with step (e) is conducted in the presence of oxygen or hydrogen peroxide.

5. The process of claim 3, wherein the circulation of acid through the absorption stages in accordance with step (e) is conducted in the presence of oxygen or hydrogen peroxide.

6. The process of claim 1 or 2, wherein in step (a), the supply of nitrous gas is interrupted by shutting off the supply of ammonia to the ammonia combustion unit.

7. The process of claim 3, wherein in step (a), the supply of nitrous gas is interrupted by shutting off the supply of ammonia to the ammonia combustion unit.

8. The process of claim 4, wherein in step (a), the supply of nitrous gas is interrupted by shutting off the supply of ammonia to the ammonia combustion unit.

9. The process of claim 6, in which said plant also includes means for the desorption of nitrous gases from $NO_x$-charged nitric acid, and said desorbed gases are turned to the intake side of the nitrous compressor, wherein the supply of nitrous gas is further interrupted by interrupting the return of $NO_x$-charged acid to said desorption means.

10. The process of claim 7, in which said plant also includes means for the desorption of nitrous gases from $NO_x$-charged nitric acid, and said desorbed gases are turned to the intake side of the nitrous compressor, wherein the supply of nitrous gas is further interrupted by interrupting the return of $NO_x$-charged acid to said desorption means.

11. The process of claim 8, in which said plant also includes means for the desorption of nitrous gases from $NO_x$-charged nitric acid, and said desorbed gases are returned to the intake side of the nitrous compressor, wherein the supply of nitrous gas is further interrupted by interrupting the return of $NO_x$-charged acid to said desorption means.

12. The process of claim 1 or 2, wherein the absorption in step (f) is conducted under substantially the same conditions as in the normal operation.

13. The process of claim 3, wherein the absorption in step (f) is conducted under substantially the same conditions as in normal operation.

14. The process of claim 4, wherein the absorption in step (f) is conducted under substantially the same conditions as in normal operation.

15. The process of claim 6, wherein the absorption in step (f) is conducted under substantially the same conditions as in normal operation.

16. The process of claim 9, wherein the absorption in step (f) is conducted under substantially the same conditions as in normal operation.

17. Apparatus for reducing $NO_x$ emissions after an emergency shutdown of a plant for the manufacture of nitric acid, which plant includes a combustion unit for the combustion of ammonia to produce nitrous gas, cooling stages for the nitrous gas, a nitrous gas compressor having an intake side and a delivery side, columns for chemical and/or physical absorption of the nitrous gases, and a tail gas turbine, wherein the improvement comprises:

(a) means for interrupting the nitrous gas supply to the intake side of the nitrous gas compressor;

(b) means for providing a run-on time of the nitrous gas compressor after the emergency shutdown which is sufficient to convey substantially all of the volume of the nitrous gas from the intake side of the compressor to the delivery side;

(c) means for shutting off the gas volume which is on the delivery side of the nitrous gas compressor;

(d) means for expanding the gas volume existing in the nitrous gas compressor to the intake side of the compressor; and (e) a vacuum system and suction means for drawing off the gas volume on the intake side of the compressor into the vacuum system.

18. The apparatus of claim 17 wherein said run-on time is at least about 10 seconds from the commencement of the emergency shutdown.

19. The apparatus of claim 17 wherein said run-on time is from about 10 seconds to about 30 seconds from the commencement of the emergency shutdown.

20. The apparatus of claim 17 wherein said means includes sufficient mass of the rotating parts of said nitrous compressor so that rotational energy stored therein provides said run-on time.

21. The apparatus of claim 18 wherein said means includes sufficient mass of the rotating parts of said nitrous compressor so that rotational energy stored therein provides said run-on time.

22. The apparatus of claim 19 wherein said means includes sufficient mass of the rotating parts of said nitrous compressor so that rotational energy stored therein provides said run-on time.

23. The apparatus of claim 20 wherein said means is further provided by the continued drive of the tail gas turbine.

24. The apparatus of claim 21 wherein said means is further provided by the continued drive of the tail gas turbine.

25. The apparatus of claim 22 wherein said means is further provided by the continued drive of the tail gas turbine.

26. The apparatus of claim 17, wherein the nitrous gas pipe on the delivery side of the nitrous gas compressor is connected upstream of the delivery side shutoff valve by a blowoff recycle pipe provided with a valve to said nitrous gas pipe between the ammonia combustion unit and the nitrous gas cooler.

27. The apparatus of claim 17, wherein the nitrous gas pipe is connected by a pipe provided with a valve to a vessel which is maintained under vacuum.

28. The apparatus of claim 27 wherein said vessel which is maintained under vacuum is a rectification system operated under vacuum.

29. The apparatus of claim 17 wherein said means includes a vessel which is connected to the delivery side of the compressor and which can be depressurized to the absorption section, or to the suction section of the compressor.

* * * * *